United States Patent [19]
Terry et al.

[11] 3,943,719
[45] Mar. 16, 1976

[54] HYDRIDE-DEHYDRIDE POWER SYSTEM AND METHODS

[76] Inventors: Lynn E. Terry, 22 Suncrest Ave., Bridgeton, N.J. 08302; Roger J. Schoeppel, P.O. Box 971, Stillwater, Okla. 74074

[22] Filed: Feb. 26, 1975

[21] Appl. No.: 553,248

[52] U.S. Cl. .................. 60/644; 60/649; 60/655
[51] Int. Cl.² .................................. F01K 25/10
[58] Field of Search ............ 60/649, 644, 650, 651, 60/655, 671, 682, 673; 62/48, 402, 467

[56] References Cited
UNITED STATES PATENTS

| | | | |
|---|---|---|---|
| 3,315,479 | 4/1967 | Wiswall et al. | 62/48 |
| 3,504,494 | 4/1970 | Winsche | 60/649 |
| 3,508,414 | 4/1970 | Wiswall et al. | 62/48 |

*Primary Examiner*—Allen M. Ostrager
*Attorney, Agent, or Firm*—Laney, Dougherty, Hessin & Fish

[57] ABSTRACT

A power system comprising a reactor for chemically forming a hydride by reaction with hydrogen at a relatively low pressure and relatively low temperature, means for heating the hydride while retaining it at a constant volume to effect chemical compression of the hydrogen, and a power generating, gas expansion device connected to the reactor for receiving hydrogen under pressure therefrom, and expanding it to derive power therefrom and simultaneously generating refrigeration by expansion of the hydrogen therethrough, and means for regenerating the hydride.

A method for deriving power and refrigeration from low-grade thermal energy is also provided and includes the steps of reversibly combining hydrogen with a hydride-forming material at a relatively low temperature and pressure, heating the hydride at constant volume, reversibly dehydriding the material to develop hydrogen at relatively higher pressure and temperature, and expanding the hydrogen through a turbine or other power producing device, and cooling the spent hydride.

31 Claims, 4 Drawing Figures

HYDRIDE-DEHYDRIDE POWER SYSTEM AND METHODS

BACKGROUND OF THE INVENTION

1. Field of the Invention

This invention relates to a method of simultaneously generating power and refrigeration from low-grade thermal energy, using hydrogen and materials which reversibly form a hydride therewith at low temperature and pressure, and which reversibly dehydride to release large quantities of hydrogen at a relatively higher temperature and pressure, which hydrogen is then used to directly produce power and yield refrigeration in a thermodynamic cycle which includes a gas expansion device.

2. Brief Description of the Prior Art

Various types of power cycles using a number of working fluids have been heretofore proposed. In one long-known and widely used system, heat energy in a working fluid is used in a Rankine cycle to drive a turbine to produce power. The cycle is completed through the sequence of condensing the working fluid, compressing the liquid, and evaporating the liquid to a high pressure vapor state. Various fluids which may be easily condensed near ambient temperature, such as water, iso-butane and chlorinated hydrocarbons, can be used as the working fluid.

In another long-known and widely used power system, gases are used as the working fluid in a Brayton cycle to drive a turbine. In a closed system, the cycle is completed by effecting recompression of the gas through the use of a compressor and heat enchangers. This type of power system differs basically from the Rankine cycle system by the nature of the working fluid and the manner by which it is recompressed. This type of power system is well known in the field of thermodynamics and is used in many high-temperature energy conversions, such as in jet engines where an open system is used and in high-temperature gas-cooled nuclear power plants.

Various types of refrigeration cycles using a number of working fluids have been heretofore proposed. In one long-known and widely used system, refrigeration is secured by vapor-compression of the working fluid with subsequent cooling to the liquid state, expansion of the liquid through an expansion valve with refrigeration being produced in that portion of the cycle where evaporation occurs. Working fluids commonly used in this vapor-compression cycle are chlorinated hydrocarbons.

In the air-standard refrigeration cycle, the phases of the cycle are essentially the reverse of those encountered in the Brayton cycle. Air is initially compressed and is then cooled before being expanded to further lower its temperature. This type of cycle is used in low-pressure air liquefaction plants, and in other liquefaction devices, such as the Collins helium liquifier.

In the absorption refrigeration cycle, absorption of the working fluid occurs at a low pressure and temperature with release at a relatively higher pressure and temperature. Subsequent cooling to the liquid state and expansion through an expansion valve produce refrigeration. Ammonia-water and lithium bromide-water are common working fluid-absorber combinations.

Various types of working fluids for use in power and refrigeration cycles have been heretofore proposed. In the Stirling cycle, hydrogen has been proposed as a working fluid which is directed in sequence to a compressor, heat exchanger and expansion device in a manner analogous to the Brayton cycle.

In U.S. Pat. No. 3,370,420 to Johnson, working fluids which thermally dissociate upon heating, and reversibly recombine in the gas phase upon cooling, are proposed for several closed cycle thermodynamic processes (Brayton, Stirling and Rankine). The patentee asserts that any non-dissociating gas, when used as a working fluid, severely restricts the efficiency of a power cycle.

A good discussion of the various advantages and disadvantages which have characterized many types of working fluids previously used in power cycles is contained in U.S. Pat. No. 3,152,357. All the described fluids are types which undergo a change of state from liquid to vapor in the course of the power cycle. An ideal working fluid is described as one having good thermal stability, high cycle efficiency, lower corrosiveness, favorable critical properties and low toxicity.

A proposal for developing power from a system comprising a multiplicity of power fluids is described in U.S. Pat. No. 3,395,103 to Anderson. Direct use of a relatively low temperature energy source, such as geothermal water, to heat and vaporize a working fluid for expansion through a turbine for the development of power has been hindered by the large cost of the heat exchanger required in order to effect heat transfer. The patentee proposes to eliminate a portion of this cost by adding a second power plant of the Rankine cycle type and using the residual heat in the hot primary fluid to heat and vaporize a different working fluid having a lower boiling point than that used in the first cycle.

Recently, the properties and useful application of various metal hydrides have been considered in power and refrigeration cycle systems. A considerable amount of work in this respect has been done under the auspices of the U.S. Atomic Energy Commission. The ability of hydrides to chemically store hydrogen at a relatively low temperature and pressure in a concentrated form, and then to release the hydrogen at an elevated temperature and pressure has been recognized, and a number of hydride-forming materials have been identified.

In U.S. Pat. No. 3,508,414 to Wiswall and Reilly, a method of storing hydrogen is described in which gaseous hydrogen is absorbed by titanium-iron alloys. When such a hydride containing 2 weight percent hydrogen is maintained at a temperature of 25°C, hydrogen is released at a constant rate until less than 1.0 weight percent of the hydrogen remains in hydride form. In U.S. Pat. No. 3,315,479 to Wiswall and Reilly, a method of storing hydrogen by formation of nickel-magnesium hydride is discussed. Similar formation of copper-magnesium hydrides is discussed in U.S. Pat. No. 3,375,676, issued to the same patentees. In U.S. Pat. No. 3,516,263, Wiswall and Reilly further discuss the formation of titanium-iron hydrides, and point out that a particular type of pressure vessel may be used to contain the hydride, and to heat the hydride to develop hydrogen pressures exceeding 10,000 psi.

By alternating the formation and decomposition of the metal hydride, workers at the Brookhaven National Laboratory have proposed, in Report No. 15844, April, 1971, to use the alternate decomposition and regeneration of the hydride as a gas circulation pump. Such systems have also been proposed for refrigeration.

More recently, in U.S. Pat. No. 3,504,494, a closed cycle method for intermittently producing high energy steam has been described. In the system here reported, a power cycle, followed by a recharging cycle, is utilized. In the power cycle, a first hydride bed is heated to desorb hydrogen gas therefrom. The gas flows to a second hydride bed where the hydrogen can be absorbed at a lower temperature than the temperature of desorption from the first bed. Absorption of the hydrogen by the second bed releases the heat of absorption which is used to convert water to steam. The steam is used for power production, and the residual heat remaining in the steam after such power production is used for heating the first hydride bed and enhancing the desorption of hydrogen therefrom. After complete desorption of the hydrogen from the first bed and condensation of the residual steam, the recharging cycle is started. In the recharging cycle, the second hydride bed is heated by a heat source which can be a low energy isotope source, a chemical heater, an electrical heater or other suitable source of thermal energy. The second bed is thus caused to dehydride, and the first bed is cooled so that it can absorb the hydrogen desorbed from the second bed preparatory to recommencing the power cycle after recharging.

An integral and essential part of this review of prior art is the lack of any finding substantiating the fact that both power and refrigeration can be practically generated from low temperature energy sources except in a conventional manner as referred to above in the examples of the use of iso-butane and chlorinated hydrocarbons. Although the prior art recognizes the possible use of hydrides in a gas circulation pump, the art does not contemplate the economic or practical or technical feasibility of large-scale commercial power generation and refrigeration, and the need for energy conservation achieved through extraction of energy from low-temperature energy sources as defined hereinbelow as the subject of this invention. it remained for the present applicants to recognize these circumstances and apply properties of hydrides and hydrogen to the preparation of a system capable of extracting power and refrigeration from low-temperature energy sources.

Brief Description of the Present Invention

A new, highly useful combination power and refrigeration system and methods for developing shaft power and refrigeration simultaneously are presented by this invention. Power and refrigeration are continuously and efficiently generated directly from hydrogen in a unique hydride-dehydride-hydrogen (subsequently referred to as HDH) cycle. Hydrogen is used as the working fluid, and is chemically compressed in the course of the HDH cycle, but is not thermally dissociated. The hydrogen has the advantage, as a working fluid, of having good thermal stability, high cycle efficiency, low corrosiveness, favorable critical properties and low toxicity. Waste or low grade heat can be utilized for freeing chemically bound hydrogen from the hydride during the course of the HDH cycle.

Broadly described, the combination power and refrigeration system of this invention comprises a plurality of hydride-dehydride reactors, means for periodically supplying hydrogen gas, and alternately heat, in out-of-phase staggered cycles to each reactor, means for removing heat from the reactors, means for continuously converting the pressure energy of pressurized hydrogen gas developed by the reactors to shaft work or power and refrigeration, and means for recycling relatively low-pressure hydrogen to the reactors. The means for periodically supplying heat to the reactors preferably comprises a low-grade thermal source, such as geothermal water, solar energy or stack gases, and the energy-to-power converting means is preferably a turbine. The energy-to-refrigeration converting means is preferably a heat exchanger.

The invention also includes a method for simultaneously developing shaft power and refrigeration from a low thermal energy source, which ideally includes the steps of reversibly combining hydrogen with a hydride-forming material at a relatively low temperature and pressure to chemically store hydrogen gas, heating the hydride at constant volume to effectively chemically compress the hydrogen gas, dehydriding the hydride material by transferring heat thereto at an elevated preferably constant temperature to release hydrogen gas under elevated constant pressure, reversibly and adiabatically expanding the pressurized hydrogen gas through a device to develop power and supercool hydrogen gas, cooling the spent hydride under constant volume to effect chemical decompression thereof so as to effectively recondition the hydride-forming material, and then cyclically repeating these steps. The preferred practice of the method of the invention entails carrying out the described steps in staggered or out-of-phase relationship using a plurality of discrete beds of hydride-forming material to develop a substantially continuous source of hydrogen under pressure for supply to the power device.

In certain embodiments of the invention, the hydrogen gas produced upon dehydriding the hydride material is used for heating.

It is an important aspect of the invention that the heat source used for supplying heat to the hydride reactors can suitably be a low-grade source of thermal energy, and such sources are preferred, although high temperature sources can be used. In this respect, the hydride-forming material utilized is preferably one which forms the hydride at relatively low temperatures and releases the hydrogen gas, through dehydriding, at suitably high pressures at a temperature which is not higher than about 450°F.

An important object of the present invention is to provide a practical means for achieving energy conversions in which a low grade source of thermal energy is utilized in a more efficient and economical manner than can be achieved with any presently existing power cycle involving a working fluid which must be heated to achieve a change of state or upgrade its energy content prior to passage into or through both power and refrigeration producing devices, said low grade thermal energy source being generally a heat source delivered to the power system of the present invention at a temperature of less than 450°F, and greater than the ambient temperature.

A further object of the invention is to provide a novel means for developing a continuous supply of high-temperature pressurized hydrogen which can be used for operating heating or refrigerating and power delivering devices.

Another object of the invention is to propose a hydride-dehydride hydrogen cycle in which pressurized hydrogen can be economically and continuously used to directly develop shaft power and refrigeration.

An additional and more specific object of the invention is to provide a practical means for the addition of a "bottoming" cycle to conventional fossil or nuclear fueled power plants utilizing the Rankine cycle, or other power cycles, wherein the powerplant utilizes a high temperature heat source and the bottoming cycle is employed to utilize the rejected heat contained in the working fluid and stack gases of such conventional power plants, such bottoming cycle as constituted by the present invention constituting an improvement in thermal energy conservation.

Another object of the invention is to provide a process and means for converting thermal energy in a way which results in reduced thermal pollution of the environment, as compared to that which is experienced with other existing means for converting the thermal energy to produce power and refrigeration.

In a different aspect, the invention relates to the apparatus by which the described means may be accomplished including the use of one or more fluid phases, one or more fluidized beds, or one or more stationary hydride beds, or gaseous hydrides, means for transferring heat to or from said hydrides, and means for expansion of the contained hydrogen for the generation of power and refrigeration.

Additional objects and advantages of the invention will become apparent as the following detailed description of certain embodiments of the invention, and detailed examples thereof, are read in conjunction with the accompanying drawings which illustrate certain preferred applications of the invention.

DETAILED DESCRIPTION OF PREFERRED EMBODIMENTS OF THE INVENTION

Figure 1:
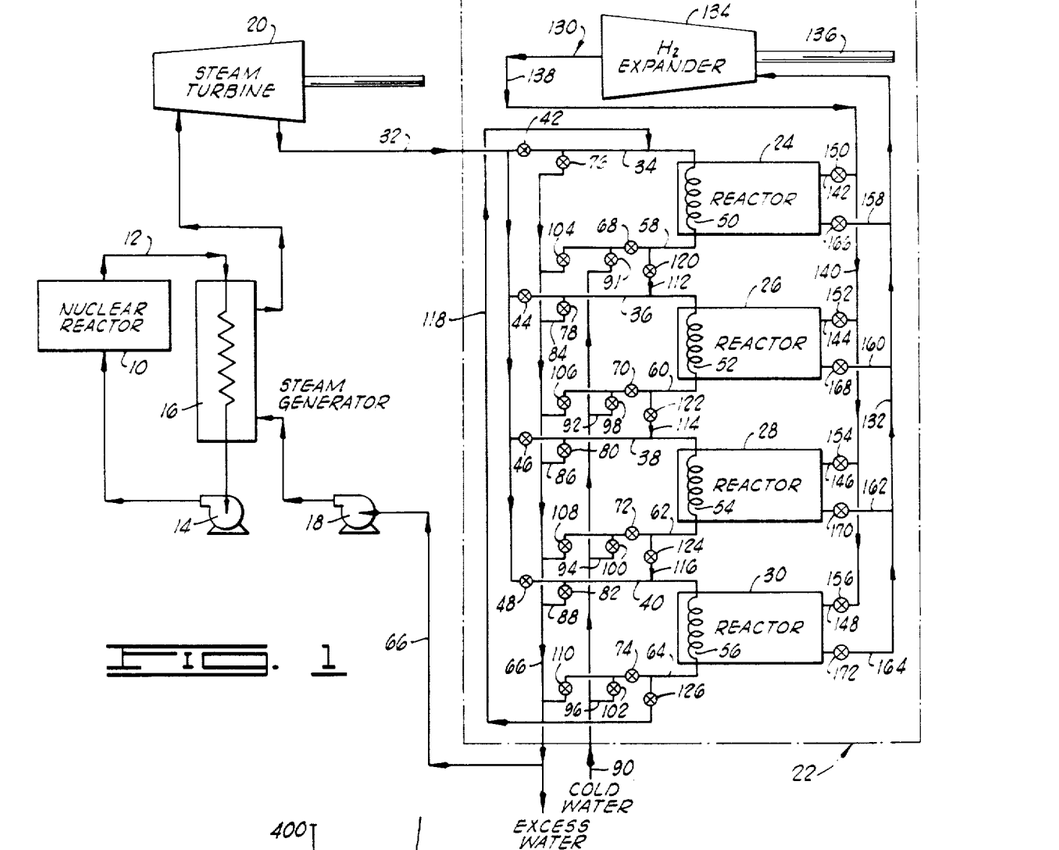
FIG. 1 is a schematic flow diagram illustrating one embodiment of the hydride-dehydride power system of the invention in use as a bottoming unit for a nuclear power plant.

Referring initially to FIG. 1 in the drawings, a nuclear reactor 10 is illustrated as being cooled by a coolant circulating in a primary coolant circulation loop 12. The coolant is pumped by a reactor coolant pump 14 through the reactor 10 to a steam generator heat exchanger 16 through which water is circulated for the purpose of steam generation by heat exchange with the hot coolant discharged from the nuclear reactor. Water is charged to the heat exchanger 16 by a feed pump 18, and steam is discharged therefrom to a steam turbine 20 through which the steam is expanded to generate power. The effluent steam from the turbine 20 constituting a low grade thermal energy source, is charged to a bottoming unit 22 which includes the power system of the present invention. Such bottoming unit includes the schematically illustrated structure enclosed within the dashed line box in the flow diagram illustrated in FIG. 1. It is to be noted at this point that, for convenience of expression, the hydride-dehydride-hydrogen power cycle of the present invention has been previously referred to herein as the HDH power cycle, and such reference previously, as well as subsequently, herein, should be understood to refer to the power cycle of this invention in which a hydride is initially formed in a reversible manner, and subsequently is heated to effect dehydriding with release of hydrogen under pressure.

The bottoming unit 22 includes a plurality of hydride reactors. In the illustrated embodiment, four of these reactors are shown, and are designated by reference numerals 24, 26, 28 and 30. Spent steam from the turbine 20 carrying residual heat is charged to the bottoming unit 22 through a conduit 32, and is admitted, in a sequence hereinafter described, to the reactors 24–30 through branch conduits 34, 36, 38 and 40 via valves 42, 44, 46 and 48. The branch conduits 34–40 are respectively connected to heat exchange loops 50, 52, 54 and 56 located in the reactors 24–30, respectively. The heat exchange loops 50–56 are also connected through branch return conduits 58, 60, 62 and 64, respectively, to a return water manifold conduit 66 through valves 68, 70, 72 and 74, respectively. The return water manifold conduit 66 is also connected to each of the branch conduits 34–40, and communication between these conduits and the water return manifold 66 is provided by a plurality of valves 76, 78, 80 and 82. It will be noted that the valves 78, 80 and 82 are located in short conduit sections 84, 86 and 88 which connect the return water manifold conduit 66 to the branch conduits 36, 38 and 40.

A cold water charging manifold conduit 90 is connected at one end through a valve 91 to the branch conduit 58 and is connected by a series of short conduit sections 92, 94 and 96 to the branch conduits 60, 62 and 64, respectively. These short conduit sections contain valves 98, 100 and 102, respectively. A valve 104 is positioned in the branch conduit 58 between the point of connection of the manifold conduit 90 to the branch conduit 58, and the point of connection of the latter conduit to the return water manifold conduit 66. Similarly, valves 106, 108 and 110 are positioned in the branch conduits 60, 62 and 64 between the points of connection of the short conduit sections 92, 94 and 96 with these respective branch conduits 60, 62 and 64 and the points where the branch conduits are connected to the return water manifold conduit 66. Residual water conduits 112, 114 116 and 118 are provided in the heat exchange medium circulation system, with the conduit 112 extending between the branch conduit 58 and the branch conduit 36 and containing valve 120. Conduit 114 interconnects the branch conduit 60 and branch conduit 38 and contains a valve 122. Conduit 116 extends between the branch conduit 62 and the branch conduit 40 and contains the valve 124. Finally, the conduit 118 interconnects the conduit 64 with the conduit 34, and contains a valve 126.

In general, the heat exchange medium circulation system functions to convey hot water from the exhaust from the turbine 20 to the several heat exchange coils or loops 50–56 via the branch conduits 34–40 in alternating or sequential operation, and to convey water containing residual heat from one of the reactors 24–30 to a second of the reactors located downstream therefrom after a portion of the heat of the water exhausted from the steam turbine 20 has been used for heating the upstream reactor to a predetermined temperature. The cold water manifold conduit 90 functions to convey water at relatively low temperature to the several heat exchange coils or loops 50–56 in alternating sequence with respect to the conveyance of hot water from the turbine 20 thereto, and the return water manifold conduit 66 functions to collect water at relatively low temperature which has been circulated through the heat exchange loops or coils 50–56 in the reactors 24–30, and return at least a portion of this water to the feed pump 18 of the nuclear reactor system. The manner in which the heat exchange medium circulation system is employed in providing heat in an alternating cyclical fashion to the reactors 24–30 will be hereinafter explained in greater detail.

A hydrogen gas power loop is included within the bottoming unit 22 and is designated generally by reference numeral 130. The hydrogen gas power loop includes a collection manifold conduit 132 for continuously receiving hydrogen gas under pressure in a selected and alternating cyclical fashion from the reactors 24–30. The manifold conduit 132 delivers the hydrogen gas at elevated temperature and pressure to a power producing hydrogen expander device, such as a turbine 134, through which the hydrogen is expanded to cause rotation of the turbine to produce shaft power through rotation of the shaft 136. The hydrogen gas, at reduced temperature and pressure, is discharged from the turbine 134 into a conduit 138 forming a portion of the hydrogen gas power loop, and is returned via a hydrogen gas charging manifold 140 through a series of branch conduits 142, 144, 146 and 148 to the reactors 24–30, respectively. The branch conduits 142–148 contain, respectively, valves 150, 152, 154 and 156. For the purpose of conveying hydrogen gas at high temperature and pressure from the reactors 24–30 to the collection manifold 132, a plurality of branch conduits 158, 160, 162 and 164 are provided, and contain valves 166, 168, 170 and 172, respectively.

Each of the reactors 24–30 is a closed vessel, which in the illustrated embodiment of the invention, contains a solid material capable of reacting with hydrogen gas at relatively low temperature and pressure to form hydride compounds. Preferably the solid material used in the reactors for formation of the hydride is capable of reacting with hydrogen to form a stable hydride at a temperature below about 150°F at a pressure which does not exceed 10 atmospheres. Materials which are suitable for use in the reactor include, but are not limited to, nickel-magnesium alloys, iron-titanium alloys, copper-magnesuim alloys, vanadium metal, lanthanum-nickel compounds, lanthanum-cobalt compounds, scandium metal, scandium-cobalt compounds, and compounds of the generic formula RT$_5$, where R is a lanthanide ion, and T is a 3d-transition metal. A very suitable material, and one preferred for use in the reactors, is an iron-titanium alloy. The alloy can contain from about 20 weight percent to about 65 weight percent of iron, with the remainder being substantially entirely titanium.

Typically, the solid hydride-forming materials utilized in the reactors are materials which will combine chemically with hydrogen gas at relatively low temperatures and pressures to form a hydride. The hydrides which are formed by such chemical reaction may contain varying atomic ratios of titanium, iron and hydrogen in the hydride molecule, depending upon the pressure and temperature at which the hydride reaction occurs. Stated differently, various equilibrium states exist in which varying amounts of hydrogen are chemically bound in the hydride compound, with such amounts of combined hydrogen depending upon the equilibrium temperature and pressure utilized, and the particular base material employed. Preferably a hydride-forming material is employed which will reach an equilibrium state in which at least one atom of hydrogen is combined in the hydride for each atom of one of the atomic species present in the hydride-forming material at an equilibrium temperature which does not exceed about 150°F, and at an equilibrium pressure which does not exceed about 10 atmospheres. In the case of the titanium-iron alloy, in an alloy containing 54.1 weight percent iron and 45.9 weight percent titanium (in an atomic ratio of 1:1), it is preferred to employ conditions in the reactor, as herinafter explained, which will develop a hydride in equilibrium (saturated with hydrogen) at a temperature of about 100°F and a pressure of about 6.8 atmospheres. Under these conditions, the hydride contains, at equilibrium, on the average of one atom of iron, one atom of titanium and 1.04 atoms of hydrogen in each molecule of the hydride. The selected equilibrium pressure and temperature employed for other hydride-forming materials will, of course, vary, depending upon the hydriding characteristics of the material, and the particular heat sources available for supplying heat for bringing the hydride up to the equilibrium temperature, and then activating the hydride prior to release of the pressurized hydrogen gas.

With respect to the characteristic response of hydrideable materials to exposure to hydrogen gas under varying conditions of temperature and pressure, the relationship of the equilibrium pressure to the equilibrium temperature at which a particular hydride will exist is expressed by the equation $$\ln P_{eq.} = -\frac{A}{T_{eq.}} + B$$

where $P_{eq.}$ is the equilibrium pressure of the hydrogen in atmospheres, $T_{eq.}$ is the corresponding equilibrium temperature in degrees Kelvin, $A$ is a constant with dimensions of temperature, and $B$ is a constant without dimensions. On the basis of the specified equation, which is characteristic of materials which undergo hydriding to an equilibrium state upon exposure to hydrogen gas, the preferred hydrideable materials for use in the present invention can be determined. Such materials are those which develop the highest equilibrium pressure for the lowest equilibrium temperature, and which, of course, chemically combine with the maximum amount of hydrogen gas at such equilibrium conditions. This, of course, results in the production of the greatest volume of hydrogen gas at the relatively highest pressure with the lowest requisite thermal input in order to hydride the starting material to an equilibrium condition. Very suitable hydride-forming materials for use in the invention are those which combine at least one atom of hydrogen per molecule under equilibrium conditions such that $A$ is less than 10,000 and $B$ is less than 30. The most preferred hydrideable materials are those which combine at least 1.5 atoms of iron per molecule of the hydride, under equilibrium conditions such that $A$ is less than 4500 and $B$ is less than 20.

In the operation of the HDH power cycle in the bottoming unit 22 illustrated in FIG. 1, the reactors 24–30 are operated in staggered or out of phase sequence during the cycle, with each reactor undergoing a hydriding, pressurizing, dehydriding and depressurizing phase during each cycle of operation. In order to more lucidly explain the overall operation of the system, the operation of the reactor 24 will initially be described before discussing the alternating sequence in which the three reactors are operated. At the outset, the iron-titanium alloy in reactor 24 will be considered to be a depressurized, dehydrided state — i.e., a hydride of the metallic alloy has not been formed, and the temperature in this reactor has been reduced to ambient temperature or lower as a result of the circulation of cold water through the heat exchange coil 50 in this reactor. This depressurized status occurs following the dehydriding phase of the cycle as hereinafter explained.

At this time, cold water from the cold water manifold conduit 90 is allowed to pass into the reactor 24 and through the heat exchange coil 50 by opening the valves 91, 68 and 76. The valves 42, 104, 120, 126 and 166 are closed at this time. At the commencement of the hydriding phase, the valve 150 in the branch conduit 142 is opened to permit hydrogen gas from the turbine 134 to be charged to the reactor 24 through the conduit 138 and branch conduit 142. The hydrogen is charged to the reactor at a typical pressure of 6.8 atmospheres and temperature of about 210°K (−81°F).

As the hydrogen enters the reactor under these conditions of temperature and pressure, it combines chemically with the iron-titanium alloy therein in an exothermic chemical reaction. The exothermic chemical reaction which occurs evolves sufficient heat that the temperature is preferably controlled through the use of the cold water circulated through the heat exchange loop or coil 50 in the reactor.

The temperature and circulation rate of the water are regulated to prevent the temperature of the hydride bed in the reactor from exceeding the equilibrium temperature of 311°K (100°F), this temperature representing the temperature condition at which, when the system is at 6.8 atmospheres pressure, an equilibrium state is reached in the hydride compound in which 1.04 atoms of hydrogen are, on the average, combined with the atoms of iron and titanium in each of the hydride molecules, and the hydride is saturated with respect to hydrogen. This point is represented in the temperature-entropy diagram of FIG. 2 of the drawings by the point A.

When the saturated hydride in equilibrium is produced by chemical combining of the hydrogen with the alloy, the valving is changed to cause the reactor 24 to enter the pressurizing or activation phase of the HDH power cycle. At this time, relatively warm or hot water is circulated to the heat exchange coil or loop 50 within the reactor 24 by opening the valve 126 in the conduit 118 and closing valve 74 in the conduit 64. At this time, the valves 42, 150, 166, 91, 120 and 76 are closed so that the hot water circulated through the coil 50 returns, after passage therethrough, through the open valves 68 and 104 to the return water manifold conduit 66.

The passage of the relatively hot water through the coil 50 increases the temperature in the reactor 24 from 311°K (100°F) to 386°K (235°F) and the pressure is increased to about 55 atmospheres. This pressurizing or activating phase of the HDH cycle is represented by the line AB on the temperature-entropy diagram of FIG. 2, and the attainment of the fully pressurized status is represented by point B of the diagram. In undergoing the pressurizing phase, the hydrogen gas which is chemically combined in the hydride is chemically compressed by carrying out the heat transfer under constant volume in the reactor 24. It will be noted that completion of the pressurization phase by the attainment of the maximum temperature of 386°K (235°F) is relatively easily susceptible to attainment using many low thermal energy heat sources, such as the residual steam discharged from the steam turbine 20, and it may here be beneficial to recall that other low thermal energy sources, such as geothermal water, can also be used to develop temperatures of this magnitude.

The next phase of the HDH cycle undergone by the reactor 24 is the dehydriding phase. Upon commencement of this phase, the valve 166 is opened to release pressurized hydrogen gas to the collection manifold 132. The valve 42 is concurrently opened to allow hot water from the turbine 20 to be charged to the heat exchange loop 50, and the valves 68, 76, 91, 104, 126 and 150 are closed and the valve 120 is opened. It will be noted that the opening of the valve 120 permits water still containing a substantial amount of heat to be charged through the conduit 112 to the conduit 36, and from this conduit to the heat exchange loop 52 in the reactor 26. At this time, the reactor 26 is undergoing the pressurizing or activating phase preparatory to dehydriding.

Figure 2:
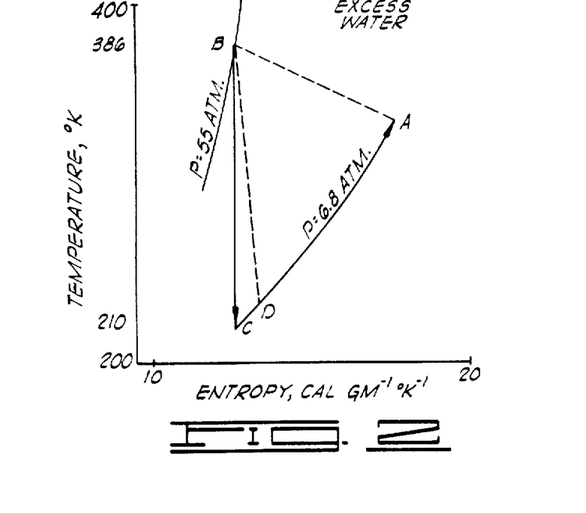
FIG. 2 is a temperature-entropy diagram of hydrogen for the HDH power cycle used in the bottoming unit illustrated in FIG. 1.

With the valving in conduits leading to the reactor 24 in the status described, the hydride, which may be then at a temperature substantially above the aforesaid equilibrium temperature, commences to release the chemically compressed hydrogen gas which controllably enters the collection manifold conduit 132 at a pressure of 55 atmospheres and a temperature of 386°K. The hydrogen gas, under pressure and at relatively high temperature, is thus permitted to flow to the turbine 134 where it is expanded through the turbine to produce shaft power. Expansion through the turbine 134, of course, reduces the pressure of the hydrogen gas, and concurrently cools the gas. The isentropic expansion line BC on the temperature-entropy diagram of FIG. 2 represents the ideal recovery of energy from the hot, pressurized hydrogen gas by expansion through the turbine 134. The dashed line BD represents the actual or practical expansion through the turbine, showing the increase in entropy due to friction losses in the turbine. The hydrogen gas discharged from the turbine typically has a temperature of 210°K (−81°F), and is expanded to a pressure of 6.8 atmospheres as hereinbefore discussed. This phase of the HDH cycle — i.e., expansion through the turbine with the resultant depressurization and cooling of the hydrogen gas may be referred to as the dehydriding phase of the HDH cycle.

With the continued application of heat from the relatively hot water derived from the steam turbine 20, the hydrogen gas continues to be released from the hydride at a constant pressure of about 55 atmospheres. Characteristically, the pressure at which the hydrogen is released from the hydride bed remains substantially constant until substantially all of the hydrogen has been chemically diassociated from the iron-titanium alloy. The dehydriding continues until substantially all of the hydrogen previously chemically combined in the hydride is released as free hydrogen.

After the completion of the dehydriding phase, that is, after all the hydrogen gas has been released from the hydride, the material in the reactor is caused to enter the depressurizing phase. In this phase of the HDH cycle, the valves 42, 104, 120, 126, 150 and 166 are closed, and a coolant such as cold water is circulated through the heat exchange loop or coil 50 by opening the valves 91, 68 and 76 and placing the cold water manifold 90 in communication with the branch conduit 58. The reactor 24 is thus prepared for the commencement of the exothermic reaction occurring when the hydrogen gas discharged from the turbine 134 is introduced to the reactor 24 under temperature and pressure conditions favoring formation of the hydride, with concurrent release of heat as hereinbefore described.

The described four-phase HDH cycle is characteristic of the operation of each of the reactors 24-30. By properly synchronizing the out-of-phase operation of the four reactors, hydrogen gas under high pressure is continuously supplied to the collection manifold 132 and to the turbine 134 so that the turbine operation is continuous, and a continuous recovery of energy from the hydrogen gas, the conversion thereof to shaft power, is realized. In the sequential mode of operation of the four reactors 24-30, one of the reactors (say, the reactor 24) is undergoing the dehydriding phase, a second of the reactors, such as the reactor 26 is undergoing the pressurizing or activation phase, another of the reactors such as the reactor 28 is undergoing the hydriding phase and the fourth reactor is undergoing the depressurizing phase. The operations of the several reactors 24-30 are staged so that the reactor which is undergoing pressurizing is adjacent the reactor undergoing dehydriding and can receive from the dehydriding reactor, heat exchange water carrying residual heat which has passed through the heat exchange coil within the dehydriding reactor after being charged thereto from the steam turbine 20. In this way, the residual thermal energy not lost in the heat exchange occurring in the dehydriding reactor is yielded up in the pressurizing or activation stage to elevate the temperature to the point where the dehydriding can be commenced.

In order to more fully explain and clarify the synchronization and sequential operation of the phases of the HDH cycle undergone by the several reactors 24-30 during operation of the bottoming unit 22, Table I is provided which shows the status of the various valves used in the heat exchange medium delivery system as the several reactors undergo phase changes.

understood, of course, that a greater or lesser number of the hydride reactors can be employed than the four reactors 24-30 shown in FIG. 1, but either three or four reactors are preferred in order to provide the most effective continuous supply of the high pressure hydrogen gas.

Figure 3:
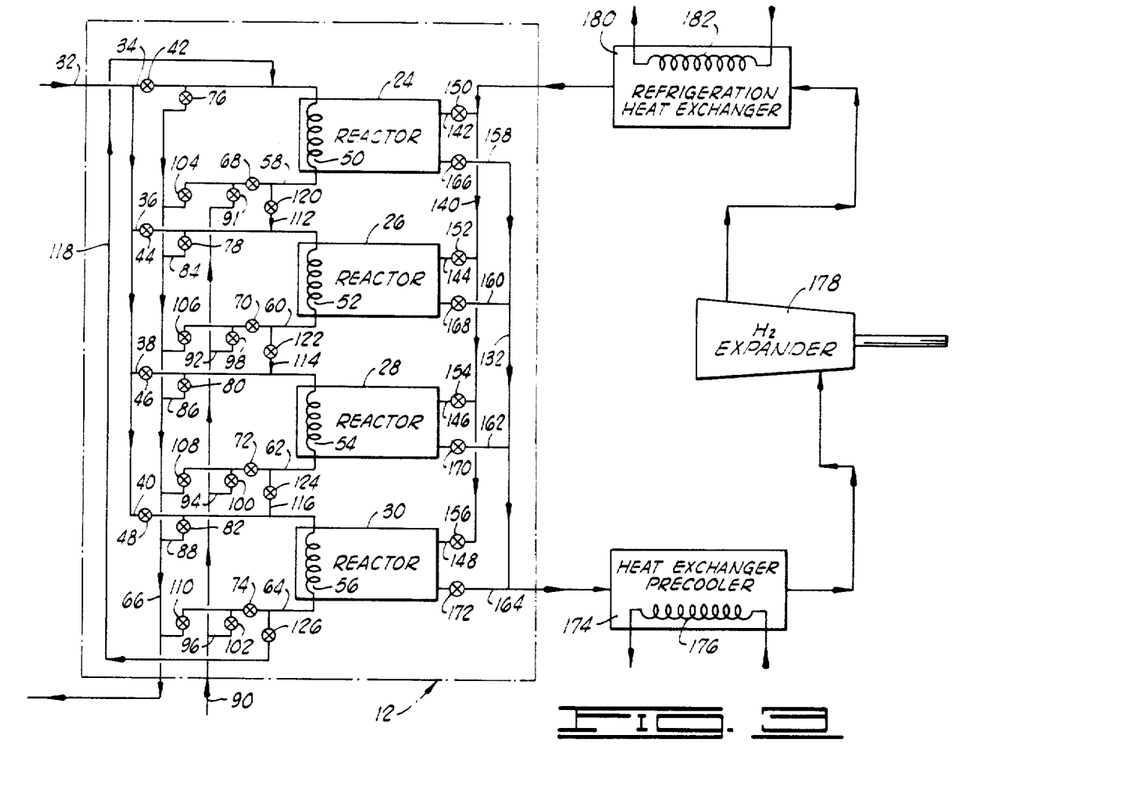
FIG. 3 is a schematic flow diagram illustrating another embodiment of the invention in which the HDH cycle is used to develop refrigeration, heating and power.

In FIG. 3 of the drawings, the HDH cycle of the invention is shown in use for producing shaft power by expansion through a turbine, in conjunction with utilizing the thermal energy of the hydrogen discharged continuously from the hydride reactors to heat an external fluid, and using cold hydrogen discharged from the turbine to refrigerate an external fluid. In the system illustrated in FIG. 3, the reactors 24, 26, 28 and 30, are again illustrated, as are the heat exchange loops or coils 50, 52, 54 and 56, and the conduit or piping network used to convey a heated fluid to these heat exchange coils and also to convey a refrigerant or cooling liquid to the coils. This part of the system is identical to that illustrated in FIG. 1 and identical reference numerals have therefore been utilized in identifying the parts thereof.

In the system illustrated in FIG. 3, hydrogen gas released during the dehydriding phase of the HDH cycle from each of the reactors is passed to, and enters, the collection manifold conduit 132 at a pressure of 45 atmospheres and a temperature of about 378° K. (221° F.). The hydrogen is initially passed through a pre-cooler heat exchanger 174 in which a substanial portion of its heat is given up to an external liquid passed through a heating coil or loop 176. In passing through the pre-cooler, heat exchanger 174, the temperature of the hydrogen gas is lowered from 378° K. to 311° K. (100° F.). The hydrogen gas at this temperature and at a pressure of 45 atmospheres is then expanded through the turbine 178. Expansion through the turbine 178 reduces the pressure of the gas to 6.8 atmospheres, and reduces the temperature to 177° K. (−141° F.). The isentropic expansion line is the line CD in the temperature-entropy diagram of FIG. 4. The practical expansion line is the dashed line CE in the diagram. Hydro-

TABLE I

|  | Reactor 24 | Reactor 26 | Reactor 28 | Reactor 30 |
|---|---|---|---|---|
| Hydriding Phase | | | | |
| Valves Open | 91,68,76,150 | 152,98,78,70 | 100,72,80,154 | 156,102,74,82 |
| Valves Closed | 104,42,126,166,120 | 168,106,120,122,44 | 108,46,170,124,122 | 172,110,126,124,48 |
| Pressurizing Phase | | | | |
| Valves Open | 126,68,104 | 120,70,106 | 122,72,108 | 124,74,110 |
| Valves Closed | 91,166,120,42,76,150 | 122,98,44,78,152,168 | 80,124,154,170,46,100, | 126,48,156,172,102,82 |
| Dehydriding Phase | | | | |
| Valves Open | 42,120,166 | 44,122,168 | 170,46,124 | 48,126,172 |
| Valves Closed | 150,91,104,68,76,126 | 78,152,70,98,106,120 | 154,72,122,100,108,80 | 82,74,156,102,110,124 |
| Depressurizing Phase | | | | |
| Valves Open | 91,68,76 | 98,78,70 | 100,72,80 | 102,74,82 |
| Valves Closed | 150,166,42,120,126,104 | 152,168,106,44,122,120 | 154,170,46,122,124,108 | 156,172,126,124,48,110 |

Figure 4:
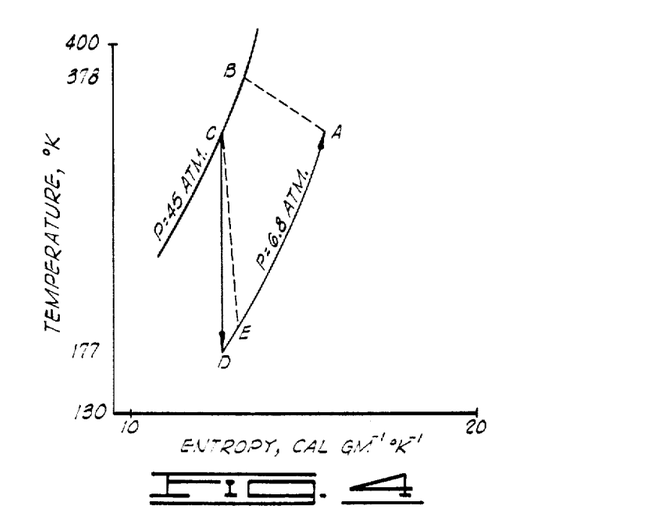
FIG. 4 is a temperature-entropy diagram of hydrogen for the cycle depicted in FIG. 3.

From the foregoing description of the method of use of the HDH cycle of the present invention as a bottoming unit employed with the coolant system employed in a nuclear reactor, it will be perceived that the system of this invention provides a highly useful method for continuously providing high temperature hydrogen gas with a relatively low thermal energy input. Highly efficient utilization of the residual thermal energy in the steam discharged from the steam turbine 20 is accomplished and, through the sequential and out-of-phase operation of the several reactors, a continuous supply of hydrogen is delivered to the turbine 134. It will be gen from the turbine 178 is then passed through a heat exchanger 180, having an external heat exchange medium circulated therethrough. This may for example, be a gas which is to be liquified by passage through a heat exchange loop or coil 182 located in the heat exchanger 180. In the heat exchanger 180, the cold hydrogen gas from the turbine 178 absorbs heat from the heat exchange medium passed through the coil 182 to liquify this medium, or reduce its temperature. The temperature of the hydrogen is elevated by such heat exchange, thus causing the hydrogen to move along the line DA of the temperature-entropy diagram as the temperature of the hydrogen is increased. At some temperature above −140° F. which is dependent upon the extent of heat exchange in the heat exchanger 180, the hydrogen gas then enters one of the reactors 24–30 which is ready to undergo the hydriding phase of the HDH cycle.

It will be perceived from the description of FIG. 3 that the HDH power cycle has here been employed to provide, not merely the development of shaft power through expansion through a turbine, but that the high pressure, high temperature hydrogen gas from the hydride reactors employed has also been used for both heating and cooling purposes.

From the foregoing description of the hydride-dehydride-hydrogen power system of the present invention and the methods of its usage, it will be perceived that a highly useful system is proposed for continuously providing a supply of clean, high-pressure hydrogen gas from a relatively compact source. The chemical storage of the hydrogen gas in the form of the hydride within the several reactors allows tremendous volumes of hydrogen gas to be chemically stored in a small volume in this way, and to be released at high pressure when needed. It is preferred always to operate the system of the invention under equilibrium conditions and using hydridable materials such that the hydrogen gas released and circulated in the system will not exceed about 4 450° F., and thus obviate the occurrence of significant hydrogen embrittlement of the metals in the system which are contacted by the gas. The method is operative at high hydrogen temperatures, of course, but one of the main advantages of the invention is the capability of using the relatively low energy thermal source for activating the hydride bed and carrying out the dehydriding step. The conventional compressors employed in the Rankine and Brayton cycles have here been replaced by the chemical compression of the hydrogen by effecting the chemical storage in the form of a solid hydride. It will be perceived that the system shown in FIG. 3 provides the HDH cycle equivalent of the air-standard refrigeration cycle which is essentially the reverse of the Brayton cycle. The compressor used in the air-standard refrigeration cycle has, however, been replaced by the hydride reactors which function to chemically compress the hydrogen gas.

It may be noted further that since the absorption of the hydrogen and the formation of the hydride is a chemical reaction, the hydrogen is absorbed selectively is such reaction, and is freed of any impurities which may be entrained therein. Thus, upon release of the hydrogen under pressure from the hydride beds, high purity hydrogen is released, and there is less opportunity for impurity contamination of the turbine and other components of the system in use.

It will also be seen that one of the principle uses of the foregoing described system is to permit geothermal water to be efficiently utilized in an HDH power plant for producing shaft work or, if desired, generating electricity.

Although certain preferred embodiments of the invention have been herein described in order to illustrate the principles of the invention, it will be understood that various changes and innovations in the illustrated and described embodiments can be effected without departure from the basic principles of the invention. Thus, the hydride reactors have been described as fixed bed reactors in which the hydridable material and the hydrides formed therefrom are stationary. Fluidized beds may, however, be utilized. Various means for transferring heat to the hydride to obtain chemical compression of the hydrogen gas (activation) may be employed. Other types of work development devices can also be utilized for conversion of the pressure energy of the hydrogen gas to useful work. All such changes are deemed to be circumscribed by the spirit and scope of the invention except as the same may necessarily be limited by the appended claims or reasonable equivalents thereof.

What is claimed is:

1. A power system comprising:
   hydride-dehydride reactor means for chemically forming a hydride by reaction of a hydrideable material with hydrogen gas;
   means for periodically supplying hydrogen gas to said reactor means;
   means for supplying heat to the reactor means in alternating sequence with the supply of hydrogen gas thereto for effecting chemical compression and dehydriding of the hydride;
   means for removing heat from the reactor means; and
   means for continously converting the pressure energy of hydrogen gas released from the reactor means upon dehydriding to shaft power by concurrent expansion and cooling of the hydrogen gas.

2. A power system as defined in claim 1 wherein said converting means comprises a turbine.

3. A power system as defined in claim 1 wherein said reactor means contains a hydrideable material capable of forming a hydride and later releasing pressurized hydrogen gas from said hydride at a temperature of less than 450° F. following chemical compression and upon dehydriding.

4. The power system as defined in claim 1 wherein said reactor is a closable chamber containing a hydrideable material selected from the group consisting of nickel-magnesium alloys, iron-titanium alloys, copper-magnesium alloys, vanadium metal, scandium metal, scandium-cobalt compounds and compounds of the generic formula R T$_5$, where R is a lanthanide ion and T is a 3d-transition metal ion.

5. A power system as defined in claim 4 wherein said hydrideable material is an iron-titanium alloy.

6. A power system as defined in claim 1 wherein said means for removing heat from said reactor means comprises a conduit system for circulating a fluid at ambient temperature or lower to the reactor means.

7. A power system as defined in claim 1 wherein said means for conveying hydrogen gas to said reactor means comprises:
   a conduit connected between said converting means and said reactor means; and
   refrigeration heat exchange means connected to said conduit for circulating a fluid into heat exchange relation to hydrogen gas flowing from said converting to said reactor means.

8. A power system as defined in claim 1 wherein said means for supplying heat to said reactor means comprises:
   nuclear reactor means including:
     a nuclear reactor;
     means for supplying a coolant fluid to said nuclear reactor; and
     means for conveying said coolant fluid from said nuclear reactor to said hydride-dehydride reactor means.

9. A power system as defined in claim 1 and further characterized as including heat exchange means connected between said reactor means and said converting means for heating a fluid passed into heat exchange relation to hydrogen gas flowing from said reactor means to said converting means.

10. A power system as defined in claim 1 wherein said reactor means comprises a plurality of hydride-dehydride reactors operated in staged, out-of-phase sequence to develop high pressure hydrogen gas supplied substantially continuously to said converting means.

11. A power system as defined in claim 10 wherein said means for supplying heat comprises a conduit and valving system for supplying a heated fluid to each of said hydride-dehydride reactors at a time when said hydrogen gas supplying means is inoperative to supply hydrogen gas to the respective hydride-dehydride reactor.

12. A power system as defined in claim 11 wherein said converting means comprises a turbine.

13. A power system as defined in claim 12 wherein said means for supplying heat comprises a waste heat source supplying a fluid to said conduit and valving system at a temperature of less than 450° F.

14. A power system as defined in claim 13 wherein said reactor is a closable chamber containing a hydrideable material selected from a group consisting of nickel-magnesium alloys, iron-titanium alloys, copper-magnesium alloys, vanadium metal, scandium metal, scandium-cobalt compounds and compounds of the generic formula $R\ T_5$, where R is a lanthanide ion and T is a 3d-transition metal ion.

15. A power system as defined in claim 14 wherein said hydrideable material is an iron-titanium alloy.

16. A power system as defined in claim 14 wherein said means for conveying hydrogen gas to said reactor means comprises:
a conduit connected between said converting means and said reactor means; and
refrigeration heat exchange means connected to said conduit for circulating a fluid into heat exchange relation to hydrogen gas flowing from said converting means to said reactor means.

17. A power system as defined in claim 14 and further characterized as including heat exchange means connected between said reactor means and said converting means for heating a fluid passed into heat exchange relation to hydrogen gas flowing from said reactor means to said converting means.

18. A power system as defined in claim 12 wherein said reactor means contains a hydrideable material capable of forming a hydride and later releasing pressurized hydrogen gas from said hydride at a temperature of less than 450° F. following chemical compression and upon dehydriding.

19. A power system as defined in claim 18 wherein said hydrideable material forms a stable hydride containing at least 1.0 atom of hydrogen per molecule, and the equilibrium conditions of temperature and pressure at which said hydride exists are such that in the equation $$\ln P_{eq.} = -\frac{A}{T_{eq.}} + B$$

where $P_{eq.}$ and $T_{eq.}$ are the equilibrium pressure and equilibrium temperature, in units of atmospheres and degrees Kelvin, respectively, A is less than 10,000° Kelvin, and B, a dimensionless constant, is less than 30.

20. A method for deriving power and refrigeration from a low-grade thermal energy source comprising:
combining hydrogen gas with a hydride-forming material under conditions of temperature and pressure such that a hydride saturated with, and in equilibrium with, hydrogen gas is formed;
heating the hydride at constant volume to a temperature above the equilibrium temperature of the hydride to chemically compress the hydrogen gas;
transferring heat to the hydride and concurrently releasing the hydrogen gas therefrom;
concurrently conveying the released hydrogen gas from the hydride to a power producing expansion device;
expanding the hydrogen gas through said power producing expansion device to produce power and cool the hydrogen gas; and
after release of substantially all of the hydrogen gas from the hydride, cooling the spent hydride under substantially constant volume to effect chemical decompression thereof; then
cyclically repeating the foregoing steps.

21. A method as defined in claim 20 wherein said hydride forming material is selected from the group consisting of nickel-magnesium alloys, iron-titanium alloys, copper-magnesium alloys, vanadium metal, scandium metal, scandium-cobalt compounds and compounds of the generic formula $R\ T_5$, where R is a lanthanide ion and T is a 3d-transition metal ion.

22. A method as defined in claim 20 wherein said hydride-forming material forms a hydrogen-saturated hydride at an equilibrium temperature of less than 125° F., and at a pressure of less than 10 atmospheres.

23. The method defined in claim 20 wherein said heating and transfer of heat steps are carried out by passing a heat exchange fluid having a temperature of less than 450° F. into heat exchange relation to the hydride.

24. The method defined in claim 20 wherein said hydride-forming material forms a stable hydride containing at least 1.0 atom of hydrogen per molecule, and the equilibrium conditions of temperature and pressure at which said hydride exists are such that in the equation $$\ln P_{eq.} = -\frac{A}{T_{eq.}} + B$$

where $P_{eq.}$ and $T_{eq.}$ are the equilibrium pressure and equilibrium temperature, in units of atmospheres and degrees Kelvin, respectively, A is less than 10,000 in degrees Kelvin, and B, a dimensionless constant, is less than 30.

25. The method defined in claim 20 wherein said hydride-forming material is an iron-titanium alloy containing equal atomic amounts of iron and titanium.

26. The method defined in claim 20 and further characterized as including the step of utilizing the hydrogen gas from the power producing expansion device to refrigerate a fluid.

27. The method defined in claim 20 and further characterized as including the step of utilizing the hydrogen gas released from the heated hydride for heating a fluid before conveying the released hydrogen gas to said power producing expansion device.

28. The method defined in claim 23 wherein said heating and transfer of heat steps are carried out by passing a heat exchange liquid having a temperature of less than 450° F. into heat exchange relation to the hydride.

29. The method defined in claim 23 and further characterized as including the step of utilizing the hydrogen gas from the power producing expansion device to refrigerate a fluid.

30. The method defined in claim 24 wherein said hydride-forming material forms a stable hydride containing an average of at least 1.5 atoms of hydrogen per molecule, and at equilibrium, A for said hydride is less than 4,500 in degrees Kelvin, and B is less than 20.

31. In a nuclear reactor system including a heat exchange coolant pump for circulating a coolant fluid to a nuclear reactor, an improved bottoming unit which comprises:

- at least one hydride-dehydride reactor containing a hydride forming material;
- means for conveying the heated coolant fluid from the nuclear reactor to the hydride-dehydride reactor to periodically heat the hydride-dehydride reactor;
- means for periodically cooling the hydride-dehydride reactor in alternating sequence with the heating of the hydride-dehydride reactor;
- a gas expansion power device connected to said hydride-dehydride reactor for receiving pressurized hydrogen gas therefrom; and
- means for recycling hydrogen gas from said gas expansion power device to said hydride-dehydride reactor.

\* \* \* \* \*

PO-1050
(5/69)

UNITED STATES PATENT OFFICE
CERTIFICATE OF CORRECTION

Patent No. 3,943,719          Dated  March 16, 1976

Inventor(s)  Lynn E. Terr and Roger J. Schoeppel

It is certified that error appears in the above-identified patent and that said Letters Patent are hereby corrected as shown below:

Column 3, line 37, change "it" to --It--;

Column 13, line 28, change "4  450°F" to --400-450°F--;

Column 13, line 49, change the first "is" to --in--;

Column 14, line 58, insert --means-- after "ing" and before "to".

Signed and Sealed this

Tenth Day of August 1976

[SEAL]

Attest:

RUTH C. MASON
Attesting Officer

C. MARSHALL DANN
Commissioner of Patents and Trademarks